United States Patent
Stults et al.

[11] 3,927,597
[45] Dec. 23, 1975

[54] BLIND FASTENER

[76] Inventors: Allan C. Stults, 424 Prospect St., Newport Beach, Calif. 92660; Raymond H. Powell, 11871 Simon Ranch Road, Santa Ana, Calif. 92705; Edward D. O'Brian, 910 Iroquois Ave., Anaheim, Calif. 92801

[22] Filed: Aug. 30, 1974

[21] Appl. No.: 502,149

[52] U.S. Cl. ................................................ 85/3 R
[51] Int. Cl.² ........................................... F16B 35/04
[58] Field of Search ................ 85/3 R, 3 K, 3 S, 23; 151/43

[56] References Cited
UNITED STATES PATENTS

| | | | |
|---|---|---|---|
| 2,203,146 | 6/1940 | Hexdall | 85/3 K |
| 2,711,115 | 6/1955 | Gisondi | 85/23 |
| 2,908,196 | 10/1959 | Apfelzweig | 85/3 R |
| 3,127,807 | 4/1964 | Modrey | 85/3 R |
| 3,248,994 | 5/1966 | Mortensen | 85/3 R |
| 3,288,014 | 11/1966 | Mortensen | 85/3 R |

Primary Examiner—Ramon S. Britts
Attorney, Agent, or Firm—Edward D. O'Brian

[57] ABSTRACT

A blind fastener capable of being mounted on a support member such as a sheet of wall board from one side of such a member can be constructed utilizing a first part having an elongated shank, a head located on one end of the shank and a holder located on the other end of the shank with a clamp serving as a second, physically separate part. The clamp is mounted on the holder through the use of co-acting mounting means on the clamp and on the holder in such a manner that it can be pivoted or moved from a position generally in alignment with the shank and the holder to a position transverse of the holder and so that it can be moved generally towards the shank when in such a transverse position. A screw is used with the fastener to secure one or more objects to the support member. When the screw is inserted from the head along the shank and generally in the direction of the holder it will deflect the clamp to such a generally transverse position if the clamp has not already moved to such position through the action of gravity. As the screw is further inserted it will engage an opening in the clamp and as the screw is turned the clamp will be drawn generally towards the shank.

6 Claims, 11 Drawing Figures

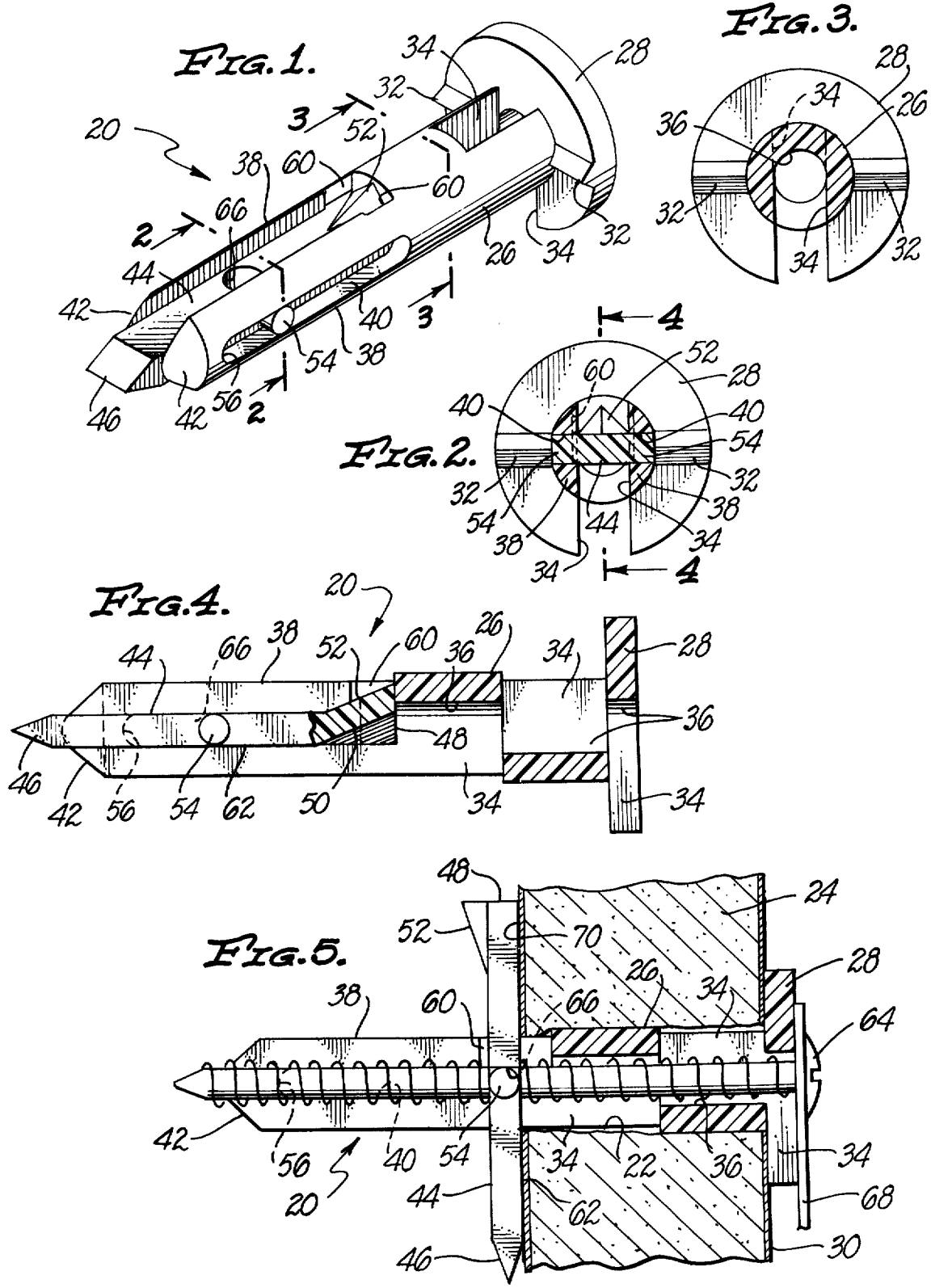

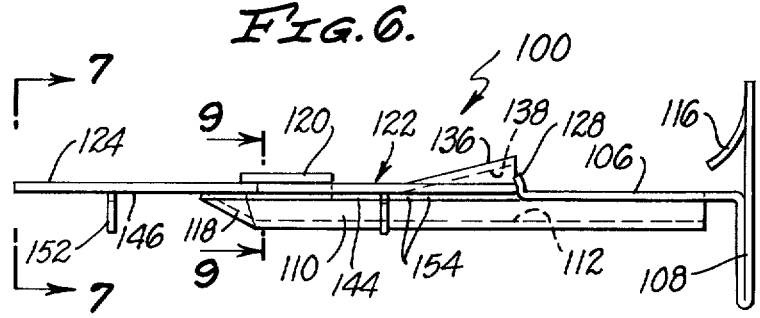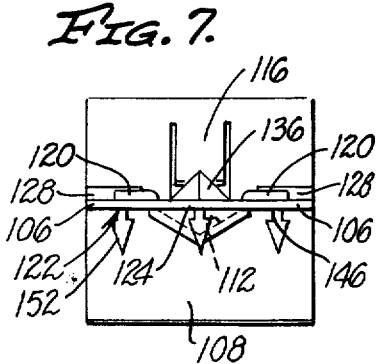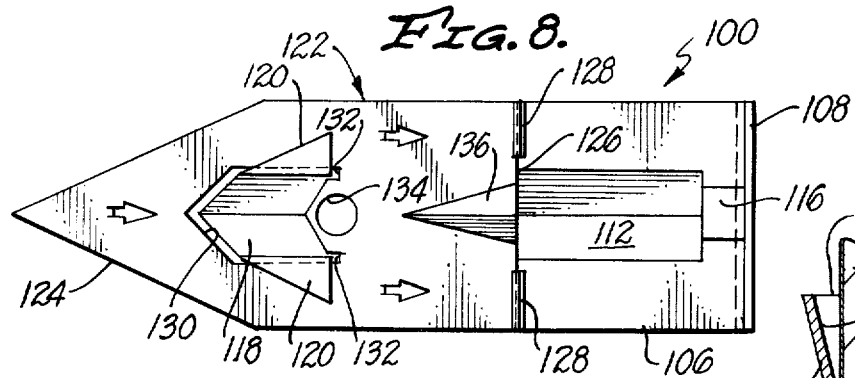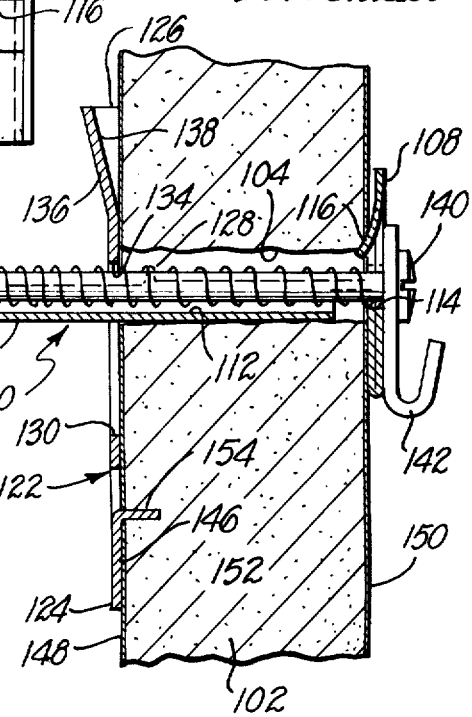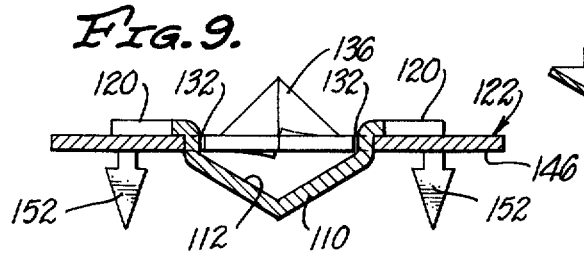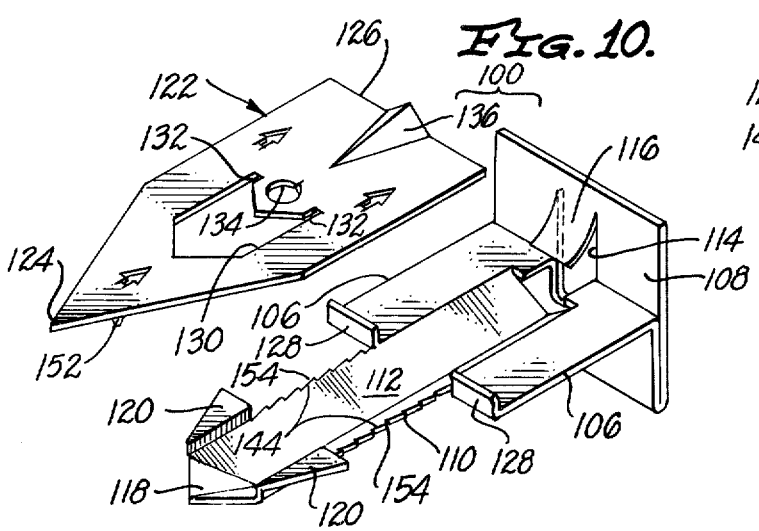

BLIND FASTENER

BACKGROUND OF THE INVENTION

The invention set forth in this specification pertains to what may be referred to as "blind fasteners".

Such fasteners are primarily intended to be utilized in connection with a support member such as a hollow wall panel in mounting of one or more items on such a support member through the use of an elongated screw. Such fasteners are commonly employed in mounting items such as pictures, plumbing fixtures and the like upon wall board used in various types of buildings. A variety of such blind fastener structures for such utilization are well known by various different names.

Perhaps the most commonly utilized of such devices are properly referred to as "crimp nuts". These are elongated structures in which a head adapted to fit against one surface of a support member carries a plurality of deformable arms, all of which are secured to a nut located remote from the head. When this type of fastener is used it is inserted through a hole in a support member as indicated and a screw is threaded into the fastener into engagement with the nut. As the nut is turned the deformable arms are compressed in such a manner as to cause them to be bent outwardly into a permanent or use position in which they engage the surface of the support member remote from the head of the fastener.

While unquestionably these crimp nut structures are utilitarian, they are considered disadvantageous because of their costs. It is considered that comparatively expensive and sofisticated manufacturing techniques are necessary to manufacture them. The manners in which these crimp nuts engage the rear surfaces of support members is frequently considered to be unsatisfactory. For certain holding operations it is necessary that a blind fastener firmly engage a comparatively significant area on the rear surface of the support member. Further, at times such crimp nuts engage support members in such a manner that the heads employed with them will rotate with the screws used with them. This obviously makes it difficult to utilize these crimp nuts in an intended fashion.

Frequently so called "spring wing toggle bolts" are utilized instead of crimp nuts as are indicated in the preceding. These structures are also comparatively expensive to manufacture. Further, they have the disadvantage that the screws used with them cannot be taken out of them after they are installed without the toggle nut portions of them being disengaged on the rear surface of a support member.

Normally the support members used with both crimp nuts and toggle bolts are predrilled to receive these structures. In some applications this is disadvantageous. It is not known to form such crimp nuts so that they and their associated screws are pointed so as to be capable of being driven through certain types of support members. It is not considered that such pointed crimp nuts are completely satisfactory for use in applications when they are hammered or driven through a wall board because as they are installed in this manner they frequently tend to break away comparatively large sections at the rear surfaces of such boards. When a significant section of the rear surface of such a board is broken away it is considered that a desired holding action is not normally achieved with a crimp nut.

In considering prior blind fasteners such as the fasteners described in the preceding discussion it is necessary to consider that such a fastener should be comparatively inexpensive in order to be commercially accepted. It is also necessary to consider that any fastener of the type discussed should also be extremely simple to employ. Also it is necessary to consider that any such fastener must be constructed in such a manner that the fastener will adequately engage a rear surface of the support member so as to provide an adequate holding action. It is believed that all prior blind fasteners of the type under consideration are not as desirable as they should be because of one or more of these reasons.

SUMMARY OF THE INVENTION

A broad objective of the present invention is to provide new and improved blind fasteners for use with support members such as wall panels. Another objective of the invention is to provide blind fasteners as hereinafter described which are comparatively inexpensive. A further objective is to provide fasteners as indicated which can be easily and conveniently utilized. An important objective of the invention is also to provide fasteners of the type indicated which will adequately engage a rear surface of a support member so as to provide an effective holding action. Further objectives and advantages of this invention will be apparent from the remainder of the specification and the accompanying drawings.

In accordance with this invention these objectives are achieved by providing a blind fastener capable of being mounted on a support member from one side of the member for use in supporting an elongated screw on the member which comprises: an elongated shank, a head located on one end of the shank, a holder extending outwardly from the other end of said shank generally in alignment with the shank, a clamp associated with the holder, this clamp being provided with a centrally located opening capable of being engaged by the screw and co-acting mounting means on the holder and the shank positioning the clamp on the holder, these mounting means serving to mount the clamp so that it can be pivoted from a position in which it is generally in alignment with the holder to a position transverse to the holder and so that the clamp can be moved along the holder towards the shank when it is transverse to the holder.

In such a fastener the head, the shank and the holder are shaped to accommodate the screw so that the screw can be inserted relative to the fastener so as to extend from the head along the shank and the holder. With this structure the clamp and the opening are shaped so as to be engaged by the screw as the screw is so inserted in such a manner that the screw extends through the opening and engages the clamp at the periphery of the opening. The clamp extends transversely to the holder when it is so engaged and is capable of being moved along the holder towards the shank when it is so engaged and as the screw is rotated.

BRIEF DESCRIPTION OF THE DRAWINGS

Since a summary such as the preceding is intended to briefly indicate the character of an invention it cannot be expected to fully and completely indicate many aspects of the invention. Further details of the invention are best more fully described with reference to the accompanying drawings in which:

FIG. 1 is an isometric view of one presently preferred embodiment of a fastener in accordance with this invention;

FIG. 2 is a cross-sectional view taken at line 2—2 of FIG.1;

FIG. 3 is a cross-sectional view taken at line 3—3 of FIG. 1;

FIG. 4 is a cross-sectional view taken at line 4—4 of FIG. 2 in which a part of the structure is shown in elevation for explanatory purposes;

FIG. 5 is a cross-sectional view corresponding to FIG. 4 in which the fastener shown in the preceding figures is illustrated in use on a sheet of wall board;

FIG. 6 is a side elevational view of another presently preferred embodiment of the invention;

FIG. 7 is an end elevational view taken in the direction of line 7—7 in FIG. 6;

FIG. 8 is a top plan view of the fastener shown in FIG. 6;

FIG. 9 is a cross-sectional view taken at line 9—9 of FIG. 6;

FIG. 10 is an exploded view of the parts of the fastener illustrated in FIGS. 6 to 9; and FIG. 11 is a cross-sectional view corresponding to FIG. 5 showing the fastener illustrated in FIGS. 6 to 10 in use on a sheet of wall board.

The two different structures illustrated in the drawings embody certain concepts or principles as are set forth and defined in the appended claims. These concepts or principles can be employed in a variety of differently appearing and differently constructed fasteners through the use or exercise of routine engineering skill. For this reason the invention is not to be considered as being limited to the precise structures illustrated in the drawings.

DETAILED DESCRIPTION

In FIGS. 1 to 5 of the drawing there is shown a blind fastener 20 of the present invention which is primarily intended to be utilized in connection with a predrilled hole 22 in an appropriate support member 24 such as a sheet of common wall board. This fastener 20 includes an elongated shank 26 which is no longer than and preferably shorter than the thickness of the member 24. At one end of the shank 26 there is located an enlarged outwardly extending head 28 which is adapted to and intended to abut against a front surface 30 of the support member 24.

Preferably this head 28 carries sharp ridges 32 which extend from it generally in the direction of the shank 26. These ridges 32 are intended to serve as engagement means for engaging the surface 30 of the member 24 in order to prevent the fastener 20 from rotating when it is being installed and as it is used. Preferably the shank 26 and the head 28 are formed utilizing what is sometimes referred to as a "blind slot" technique so as to include overlapping slots 34 which define a centrally located passage 36 leading from the head 28 through the shank 26.

In the fastener 20 this shank 26 supports two parallel spaced arms 38. These arms are provided with parallel, elongated slots 40 extending in the same plane along the length of the arms 38 away from the shank 26. These slots 40 are, however, spaced from the ends 42 of the arms 38. Within the fastener 20 these arms 38 serve as holders or holding means to support a clamp 44.

This clamp 44 is an elongated bar like structure having a front end 46 located adjacent to the ends 42 of the arms 38 when the clamp 44 is located in a position as indicated in FIGS. 1 and 4 of the drawing. When the clamp 44 is located in such a position a rear end 48 of the clamp 44 abuts against the shank 26 in such a manner that the undersurface 50 of the sloping wall 52 is located generally in alignment with the passage 36. When the clamp 44 is in this position shafts 54 extending from the clamp 44 are located within the slots 40 generally adjacent to but spaced from the ends 56 of the slots 40 adjacent to the ends 42 of the arms 38. These slots 40 and the shafts 54 constitute cooperating holding means mounting the clamp 44.

Preferably the front end 46 of the clamp 44 is further from the shafts 54 than the rear end 48. This serves to weight the clamp 44 so that it will automatically swing to a position transverse to the arms 38 and the shank 26 when the fastener is held so that the shank 26 and the arms 38 are located in a horizontal plane and so that the arms 38 extend vertically. Preferably the rear end 48 is of slightly greater width than the distance between the arms 38 and preferably these arms 38 are provided with notches 60 to accommodate this rear end 48. The purpose of this aspect of the construction of the fastener 20 is to insure that the clamp 44 will only pivot or rotate with respect to the arms 38 in such a manner that an undersurface 62 of the clamp 44 will face the shank 26.

When the fastener 20 is to be used the clamp 44 will normally be manually positioned as shown in FIGS. 1 and 4 of the drawing so as to extend generally in alignment with the shank 26 and the arms 38. As the clamp 44 is so held the fastener 20 will be moved through the hole 22 in the support member 24. When this fastener 20 is inserted in this manner so that the wall 52 on the clamp 44 is above the remainder of this clamp 44 normally the clamp 44 will automatically pivot so that the front end 58 extends downwardly.

At this point a screw 64 carrying an item 68 to be secured to the support member 24 is preferably inserted through the passage 36 to such a point that this screw 64 engages the clamp 44 around a centrally located opening 66 in this clamp 44. If for any reason the clamp 44 has not been rotated or pivoted to this transverse position relative to the arms 38 prior to the screw 64 being inserted in this manner contact of the screw 64 with the undersurface 50 of the sloping wall 52 and then with the undersurface 62 will pivot the clamp 44 to a transverse position as indicated.

In such a transverse position the contact of the screw 64 with the clamp 44 at the periphery of the opening 66 will push the clamp 44 until the shafts 54 engage the ends 56. At this point the clamp 44 cannot be moved further from the shank 26. As the fastener 20 is used the screw 64 will then be turned in a conventional manner so as to engage the clamp 44 around the periphery of the opening 66. This will cause the rotation of the screw 64 to result in the clamp 44 being pulled generally towards the shank 26 until the undersurface 62 abuts against the rear surface 70 of the support member 24. This occurs because contact of the clamp 44 with the arms 38 and/or engagement of the shafts 52 with the slots 40 will prevent this clamp 44 from rotating about the axis of the screw 64 as the screw 64 is turned.

It will be realized from the foregoing that once the fastener 20 has been located so that the clamp 44 is in a position as shown in FIG. 5 that this fastener 20 is in what may be referred to as a final position. In such a position the clamp 44 extends a significant distance on diametrically opposite sides of the hole 22. Such a distance will normally be sufficient to bridge any areas on the rear surface 62 which may have been broken out of this rear surface 62 during the drilling of the hole 22. Normally such areas will be of comparatively minor or small size when the hole 22 is formed by drilling.

In order to permit the fastener 20 to be installed by being driven through a support member such as the support member 24 the front end 46 of the clamp 44 and the adjacent ends 42 of the arms 38 are preferably tapered as shown. It is not, however, preferred to install the fastener 20 by pounding it through a support member such as the support member 24 because of the comparative bulk or diameter of this fastener 20. If the fastener 20 is to be constructed so as to be driven through a support member at least one conventional detent bump (not shown) should be formed on to the clamp 44 to releasably fit within at least one of the slots 40 so as to hold the clamp 44 against rotation about the shafts 54 as the fastener 20 is driven through such a support member.

The fastener 100 shown in FIGS. 6 through 11 of the drawings differs from the fastener 20 in a number of different respects. This fastener 100 is constructed so that it is intended to be driven through a support member 102 corresponding to the support member 24 previously described in order to create its own hole 104 through such a member 102. This fastener 100 includes a generally plate like shank 106 carrying a transversely extending head 108 at one of its ends. A single arm 110 extends from the other of the ends of the shank 106 in alignment with this shank 106. Both the shank 106 and the arm 110 are provided with a continuous bottom groove 112 which extends from adjacent to the bottom of a hole 114 through the head 108. Preferably a resilient tab 116 is located on the head 108 on the opposed upper portion of the hole 114.

This arm 110 is constructed so as to include a pointed head 118 having outwardly and upwardly diverging tabs 120. The arm 110 serves as a holder by carrying a flat plate like clamp 122 which is constructed so as to include a pointed front end 124 and a generally linear rear end 126 which is adapted to fit within the interiors of curved flanges 128 formed upon the shank 106 on opposite sides of the arm 110. This clamp 122 includes a hole 130 which enables it to be assembled upon the arm 110 in a manner as indicated in FIGS. 6 through 9 of the drawings. When the clamp 122 is so assembled small slots 132 forming a part of the hole 130 fit against the tabs 120 in such a manner as to limit movement of the clamp 122 generally away from the shank 106. This structure is designed so that the clamp 122 may be pivoted so as to extend transversely to the arm 110 as it is used.

The clamp 122 includes a centrally located opening 134 corresponding to the opening 66 in the fastener 20. This opening 134 is located so that it is generally in alignment with the hole 114 in the head 108 when the clamp 122 is within the noted transverse position. The clamp 122 also includes a sloping wall 136 having an undersurface 138 facing the groove 112. Normally the fastener 100 will be constructed so that the clamp 122 is itself clamped between the tabs 120 and the flanges 128 so as to lie flat with and generally in the same plane as the shank 106. In this position the clamp 122 is releasably held so that it can be driven through the support member 102 in much the manner in which a common nail may be driven through a wall.

After a fastener 100 is driven through a support member 102 in this manner a screw 140 carrying an item 142 to be mounted using the fastener 100 may be inserted through the hole 114 and moved generally towards the fastener 100. As the screw 140 is moved in this manner the tab 116 will tend to deflect the screw 140 downwardly so it moves through the groove 112. As the screw 140 is further inserted in this manner it will engage the surface 138 in order to exert an upward push tending to rotate the clamp 122 so as to disengage the rear end 126 of the clamp 122 from the flanges 128. As the screw 140 engages the clamp 122 in this manner the clamp 122 will pivot on the arm 110 so as to extend transversely to this arm 110.

Preferably the clamp 122 is balanced so that it will tilt up with the edges 144 of the arm 110 riding in the slots 132 through the action of gravity once it has been disengaged from the flanges 128. Such gravity caused movement can of course only occur when the clamp 122 overlies the arm 110 at the top of the fastener 100 as the fastener 100 is inserted through the support member 102. When the screw 140 is moved further this screw 140 will pass through the opening 134 and the clamp 122 will gradually be engaged around the opening 134 by the screw 140. At this time the head 118 on the arm 110 will prevent the clamp 122 from being moved off of the arm 110.

When the screw 140 is within the opening 134 it may be turned in a conventional manner so as to draw the clamp 122 along the arm 110 towards the shank 106 until such time as the surface 146 of the clamp 122 is brought into engagement with the rear surface 148 of the support member 102. This clamp 122 is sufficiently large so that it will normally bridge any portions of the rear surface 148 which have been knocked off of the support member 102 as the result of the fastener 100 being driven through this support member 102. Normally the tab 116 will engage the front surface 150 of the support member 102 so as to bite into this surface to some limited extent so as to tend to prevent the fastener 100 rotating as the screw 140 is manipulated. Primarily, however, such rotation of the fastener 100 as the screw 140 is manipulated will be prevented by the generally flat configuration of the shank 106.

Normally there will be no need to attach a clamp such as the clamp 122 in the fastener 100 or the clamp 44 in the fastener 20 to a support member. If, however, this is desired any of several different expedients may be utilized to mount such a clamp so that the screw used with the fastener may be removed after it has initially been located in operative location. One manner in which a clamp such as the clamp 122 may be constructed involves forming small rearwardly directed barbs 152 on this clamp 122. These barbs 152 will normally bite into a support member such as the support member 102 as the clamp 122 is moved to an operative position so as to secure the clamp 122 against movement as the screw 140 used with it is removed and replaced. Similar barbs can, if desired, be formed on the clamp 44.

Further, both the fasteners 20 and 100 can be constructed so as to include a ratchet action preventing movement of the clamps 122 and 44 away from a final installed position. Thus, for example, resilient ratchet teeth 154 may be located along edges 144 of the arm 110 in the fastener 100 so as to engage the edges of the slots 132 in order to prevent backing off of the clamp 122 after the clamp has been pulled towards the support member 102. Similarly, small teeth (not shown) may be located along the length of the slot 40 to prevent the shafts 54 from moving generally away from the shank 26. The normal resiliency of the material within the arms 38 will permit such teeth to act as ratchet means. It is noted, however, that expedients such as these barbs 152 or these ratchet teeth 154 are not considered to be normally needed with fasteners as described.

The screws 64 and 140 used with the fasteners 20 and 100 are preferably self-taping screws. When such self-taping screws are used it will not be necessary to thread the interiors of the openings 66 and 134. In both the fasteners 20 and 100 the arms 38 and 110, respectively, serve as parts of co-acting means for mounting the clamps 44 and 122, respectively. In the fastener 20 the shafts 44 serve as the other part of such co-acting mounting means; in the fastener 100 the slots 132 serve as the other part of such co-acting mounting means.

The operation of such means is considered quite important to the present invention. These two co-acting mounting means are intended and do in fact function so as to permit the clamps 44 and 122 used in the fasteners 20 and 100, respectively, to be inserted or driven through a support member in what may be regarded as flat, in line positions and then permit these clamps 44 and 122 to rotate to transverse positions. These co-acting mounting means also permit these clamps to then be moved so that they will lie flush against a support member such as the members 22 and 102 in order to achieve an effective clamping action.

The fastener 20 may conveniently be formed by a number of different manufacturing techniques. It is presently considered that it will be preferable to form this fastener 20 by known molding techniques out of various polymers which will not deform significantly when held under compression or tension for a prolonged period. When a fastener such as the fastener 20 is so formed the clamp 44 used with the fastener may be easily assembled in an operative position by temporarily springing the arms 38 apart. The fastener 100 shown is primarily intended to be manufactured by known metal stamping techniques. Such techniques are so well established that it is not considered necessary to describe the manufacture of the fastener 100 by them in any detail.

When so manufactured both the fasteners 20 and 100 can be created at comparatively nominal costs with little difficulty. This is important from an economic standpoint. It is also important that these fasteners 20 and 100 may be easily and conveniently utilized as indicated in the preceding discussion and that they provide an effective means of mounting a screw and one or more items held by such a screw on an appropriate member.

We claim:

1. A blind fastener capable of being mounted on a support member from one side of said member for use in mounting an elongated screw on said member which comprises:
   an elongated shank,
   a head located on one end of said shank so as to extend outwardly therefrom,
   a holder located on the other end of said shank so as to extend outwardly from said shank generally in alignment with said shank,
   said holder comprising a single elongated arm, said arm having an enlarged head positioned on the extremity thereof remote from said shank,
   an elongated clamp associated with said holder, said clamp being provided with a centrally located opening capable of being engaged by said screw,
   said head, shank and holder being shaped so as to accommodate said screw being inserted relative to said fastener so as to extend from said head along said shank and said holder,
   co-acting mounting means on said clamp and said holder (1) for positioning said clamp in an insertion position in which said clamp is generally in alignment with said shank and extends from said holder outwardly away from said shank, (2) for supporting said clamp so that it can be rotated from said insertion position to a position in which it is transverse to said shank, (3) for limiting movement of said clamp on said holder away from said shank and (4) for preventing rotation of said clamp in a plane transverse to said shank and said holder,
   said co-acting mounting means comprising a hole formed in said clamp and the edges of said arm and the portions of said enlarged head adjacent to said arm, said clamp being positioned on said arm with said arm extending through said hole, said head being sufficiently large so as to prevent movement of said clamp off of said arm during the normal operation of said fastener, and
   deflecting means on one end of said clamp, said end of said clamp containing said deflecting means being adapted to be positioned adjacent to said shank when said clamp is in said insertion position,
   said deflecting means being capable of being engaged by said screw when said screw is inserted so as to extend from said head and said shank into said holder so as to cause said clamp to be rotated from said insertion position to a sufficient extent so that said screw is further inserted, the contact of said screw with said opening in said clamp during such further insertion serving to push said clamp away from said shank until further movement of said clamp is arrested by said holder when said screw will engage the interior of said opening, further rotation of said screw upon such engagement serving to draw said clamp toward said shank.

2. A blind fastener as claimed in claim 1 wherein: said shank and said head are provided with means for use in guiding said screw as said screw is being inserted relative to said fastener so that said screw extends along said arm, and
   said deflecting means comprises a sloping wall positioned so as to be engaged by said screw as said screw is so inserted in such a manner as to cause said clamp to be pivoted toward a position transverse to said holder if said clamp should be in a position generally in alignment with said holder.

3. A blind fastener as claimed in claim 1 wherein: said clamp is held by said mounting means so that when said arm is horizontally disposed said clamp will automatically pivot to a position transverse to said holder through the action of gravity.

4. A blind fastener as claimed in claim 1 wherein: said shank and said head are provided with means for use in guiding said screw as said screw is being inserted relative to said fastener so that said screw extends along said arm, and said deflecting means comprises a sloping wall positioned so as to be engaged by said screw as said screw is so inserted in such a manner as to cause said clamp to be pivoted toward a position transverse to said holder if said clamp should be in a position generally in alignment with said holder, said clamp is held by said mounting means so that when said arm is horizontally disposed said clamp will automatically pivot to a position transverse to said holder through the action of gravity.

5. A blind fastener as claimed in claim 1 wherein:
said head, said shank and said holder are formed of a single unitary flat piece of material,
said clamp is a generally flat member and is held by said holder so that said fastener is capable of being inserted through a slot in said support member.

6. A blind fastener as claimed in claim 1 wherein:
said clamp, said holder and said shank are shaped so that said fastener can be driven through said support member.

* * * * *